(12) United States Patent
Howland

(10) Patent No.: US 6,998,165 B2
(45) Date of Patent: Feb. 14, 2006

(54) LAMINATE SYSTEM FOR A DURABLE CONTROLLED MODULUS FLEXIBLE MEMBRANE

(75) Inventor: Charles A. Howland, Temple, NH (US)

(73) Assignee: Warwick Mills, Inc., New Ipswich, NH (US)

( * ) Notice: Subject to any disclaimer, the term of this patent is extended or adjusted under 35 U.S.C. 154(b) by 50 days.

(21) Appl. No.: 10/293,828

(22) Filed: Nov. 13, 2002

(65) Prior Publication Data

US 2003/0091785 A1    May 15, 2003

Related U.S. Application Data

(60) Provisional application No. 60/337,732, filed on Nov. 13, 2001.

(51) Int. Cl.
*B32B 3/06*    (2006.01)

(52) U.S. Cl. .................... 428/105; 428/111; 428/113; 442/208; 442/209; 442/212; 442/218; 442/220

(58) Field of Classification Search ............... 442/208, 442/209, 212, 218, 220; 428/105, 111, 113
See application file for complete search history.

(56) References Cited

U.S. PATENT DOCUMENTS

| 4,942,923 A | * | 7/1990 | Geeting ................. 166/250.01 |
| 5,198,280 A | * | 3/1993 | Harpell et al. .............. 428/102 |
| 5,330,820 A | | 7/1994 | Li et al. |

OTHER PUBLICATIONS

PCT International Search Report mail date Feb. 11, 2003 of International Application No. PCT/US02/36303 filed Nov. 13, 2002.

* cited by examiner

*Primary Examiner*—Elizabeth M. Cole
(74) *Attorney, Agent, or Firm*—Maine & Asmus

(57) ABSTRACT

A fabric system for producing at least a woven fabric of controlled modulus or elongation in the MD or warp axis, has a core layer which is the main structural element, and may have one or more woven cover fabrics adhesively bonded with an off axis configuration to one or both sides of the core layer. In a preferred embodiment the core fabric is covered with at least one off axis fabric on both sides. The cover fabrics may also have resin or film top layers laminated or coated on their outside surfaces, for mechanical performance or UV protection or both.

1 Claim, 3 Drawing Sheets

LAMINATE SYSTEM FOR A DURABLE CONTROLLED MODULUS FLEXIBLE MEMBRANE

This application claims the benefit of U.S. Provisional Application No. 60/337,732 filed Nov. 13, 2001. This application is herein incorporated in its entirety by reference.

FIELD OF INVENTION

This invention relates to the construction of multi-layered, controlled modulus, special purpose fabrics, and in particular to woven fabrics of controlled modulus or elongation in the machine direction (MD) or warp axis, with covering layers bonded thereto in off axis configurations.

BACKGROUND OF THE INVENTION

The applications for flexible membranes in general include products such as sails, airfoil and wing systems, aircraft control surfaces, inflatable structures, airships, temporary shelters, liquid storage tanks, fuel tanks, flotation devices, seals and gaskets for aircraft surfaces, and door seals. Current materials in flexible membranes are based on the following techniques:

Core structural fiberous components are made of bonded scrim fiber groups. These core layers of flexible membrane designs are generally constructed with less than 10 yarns per inch in each of two orthogonal orientations. The structure of the core layer is generally formed by resin-bonded intersections between cross machine (CM) and machine direction (MD) yarns.

The MD and CM fibers provide along their thread lines or yarn directions the basic mechanical properties of elongation resistance and tensile strength. The control of elongation is important as this property allows the fabrication of structures that retain their designed shape over a range of loads. The modulus of a membrane material can be approximated by the elongation of fibers of that material under defined loads. Testing methods for measuring elongation follow ASTM (American Society for Testing and Materials) standards and use sample lengths up to 16 inches for testing accuracy.

These scrims are not generally of woven construction, and have very little structural integrity when the resin bonds have been broken. In short this type of bonded scrim has little durability with out modification and the addition of other components. In most systems these scrims deliver most of the fiber content necessary in CM and MD to control elongation and provide adequate tensile strength.

Fibers such as KEVLAR(tm) brand para-aramid, SPECTRA(tm) brand UHMW polyethylene, DYNEEMA(tm) brand UHMW polyethylene, Carbon, VECTRAN(tm) brand multifilament liquid crystal polymer, Zylon(r) polybenzoxazole (PBO), TECHNORA(tm) brand para-aramid, Polyester (Polyethyleneterephthalate) PEN (Polyethylene Naphthalate), TWARON(tm) brand para-aramid polymer, and Nylon polyamide fiber and polyester are all used in these core element scrims. (The applicant makes no claim to the trademarks.) Because of cost, larger yarn sizes are preferred. Most of these scrims use structural yarns of 1000 denier or larger. In some cases smaller non-structural yarns will be used in the opposing direction to provide for the bonding sites.

Polyester, PEN, Nylon, VECTRA(tm) brand polyster film, and other films are used for web stability. Because the scrim core layer does not provide off thread line stiffness, additional elements are used in current systems. In all current designs at least one layer of a stiff film (e.g. ½ mil polyester) is incorporated in the laminate. The film most commonly used is polyester, with a film thickness of from one quarter to one and two thousands of an inch. It should be noted that the addition of these films is not a means of adding a thermoplastic adhesive to the structure. These films are used to provide off-threadline mechanical properties and general mechanical durability.

All or most of the interconnect between MD and CD fibers in the core element or layer is adhesive or resin based. Because the core elements are not generally woven the integrity of these systems is based on the various resin adhesive bonds in the assembly. These resin adhesive systems are typically crosslinked elastoners or other crosslinked adhesive resins. Yarn is bonded to yarn and yarn is bonded to film. The result of this dependence on film interlayer and adhesive is that these structures have overall durability that is limited to the properties of the film and the adhesives used. The low to no twist yarn used in these scrims contribute to these adhesive failures.

Because of the limitations of film mechanical properties, off axis fiber components have been developed. Some products add low count, less than 15 ends per inch (epi) structures or elements on thread lines that are off or non-aligned with the 0 to 90 degree angle between the MD and CM axis. As with the MD and CM scrims these yarn layers are coarse, low-end count structures. Again, like the core scrims, the off axis scrims are not woven and at most contain crossing points only in one direction. Also like the core scrims these off axis scrims comprise yarns of little or no twist. Twist is a secondary process and adds cost.

Because of the limitations of the non-woven core, film and off axis elements, some systems include woven cover fabrics bonded to the outside of the system. These wovens may contain all the yarn types of the core elements. However most cover fabrics use deniers much smaller than 1000. In all current products the cover fabric is bonded to the core materials with its MD and CM at 0 and 90 degrees to the core elements. Only laid or bonded scrims are placed off axis.

Simple coated and saturated fabrics are also used for flexible membrane applications. In these designs there are no scrim elements. However films may be attached by adhesive bonding.

Resin bonded membrane systems have a catastrophic failure mode. Because there is little woven interlock in the structural fiber elements of the current systems, the structure can fail without failure of the fiber. Low and no twist fiber contributes to this result. These structures can delaminate and the fiber separate without breakage of fiber. In flex and tear mode the potential performance of the fiber is not realized unless the adhesive bonding quality is equal to the fiber strength. In practice this is not possible, so adhesive bonding failures are a cause for premature and catastrophic failures.

Resin and films have limited properties relative to fiber. Because of the high dependence on resin bonding, current products are limited in durability to the flex and adhesion of the bonding mechanisms.

The cosmetics of these products may suffer from local delaminating and mildew prior to a failure in performance. Because the core and off axis fiber layers use larger yarns, there tend to be void spaces or interstices in the fabric composite. When moisture enters these void spaces between the films, delaminating and mildew are frequently the result.

SUMMARY OF THE INVENTION

The applications for high strength, low stretch, flexible membranes in general include products such as sails, airfoil and wing systems, aircraft control surfaces, inflatable structures, airships, temporary shelters, liquid storage tanks, fuel tanks, flotation devices, seals and gaskets for aircraft surfaces, and door seals. There are a number of other and emerging products that have similar high strength, low stretch, flexible membrane performance requirements as the products listed above. The invention is directed to a flexible membrane system and materials that can be applied to all of these products and other products having similar membrane performance requirements. The invention is susceptible of many forms and applications.

The invention, simply stated, is a fabric or flexible membrane system for producing at least a woven fabric of controlled modulus or elongation in the MD or in the warp axis. This is the main structural element or core layer of the membrane and a principal component of invention. One or more woven cover fabrics may be adhesively and or thermoplasticly bonded to one or both sides of the core layer off the primary axis, adding one or more further threadline directions of controlled modulus or elongation to the system.

It is therefore an object of the invention to provide a flexible membrane system with a woven fabric core and woven cover fabrics all incorporating high strength fibers and a large percentage of crossing points, where the cover fabrics are applied with a calculated off-bias orientation to the core layer such that there is a reduced, uniform angle of shear dependence as between interlayer thread lines.

DESCRIPTION OF PREFERRED EMBODIMENT

Figure 1A:
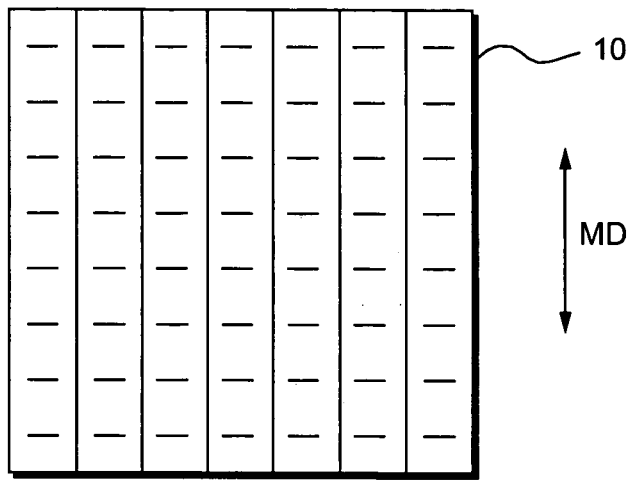
FIG. 1 is a three part diagrammatic illustration of a three layer composite membrane with a FIG. 1A core scrim with zero angle machine direction, to which a FIG. 1B plus 60 degree off axis cover fabric is applied to one side, and a FIG. 1C minus 60 off axis cover fabric is applied to the other side.

The invention is susceptible of many embodiments. Herein described are preferred embodiments not limiting of the scope of the invention. In a first preferred embodiment there is a core fabric covered with an off axis cover fabric on both sides. It is preferred that a known chemical adhesion promoter such as isocyanate or epoxy materials on the of the fiber bundles. The cover fabrics may also have resin or film top layers laminated or coated on their outside surfaces. These layers may provide mechanical performance or UV protection or both.

The core fabric is constructed in the form of a woven material using a structural fiber. The fiber may be any of polyaromatic amide, polyethylene, Carbon, multifilament liquid crystal polymer, PBO, para-aramid, Polyester, PEN, aramid polymer, and Nylon or polyamide fiber, and commercial or brand name variants thereof.

Crimp is measured by marking a length of fiber in a weave, then removing this fiber from the weave and applying a one tenth gram load per denier. The stretched length of the fiber over the length of the fiber as measured in the weave is the crimp. The design of the weaving pattern affects weave crimp and fabric tear strength and damage tolerance. The elongation under load in the thread line directions of the core element is the result of control of crimp and the elongation characteristics of the yarns selected.

The design of the core material or fabric should address control of the weaving crimp in the fiber. In order to be a true weave there must be crossing points present in both axes of the fabric or core element. Unlike a bonded scrim, which has crossing points only in the CM direction and hence no crossing point pairs a plain weave utilizes 100% of the potential crossing points. The reduction of crossing points in the weave tends to reduce the crimp, and hense elongation. However, enough crossing points must be maintained in the weave of the core structure to provide sufficient toughness. Core layers of preferred embodiments contain at least 5% of available cross over in the weave. The resistance of the system to abrasion and flogging will be improved by higher levels of crossing points.

The core woven of the preferred embodiment also incorporates high modulus yarn. There is no preferred embodiment for the fiber content of the core woven. There are a wide range of user mechanical and performance requirements affecting the final selection of fiber content. The core layer or woven may contain at least one high modulus yarn of greater than 10 grams per denier (gpd) in warp. The core woven may contain at least one high modulus yarn greater than 10 gpd in filling. The core woven may contain additional yarns that are greater than 10 gpd in warp or fill. Further, the core woven may contain only yarns that are greater than 10 gpd in warp and fill.

The elongation under load in the thread line directions of the cover fabrics is the result of control of crimp and the elongation characteristics of the yarns selected. Cover fabric will typically contain more crossing points than the core structure. Issues of abrasion and damage tolerance are paramount to control of elongation in these cover fabric elements or components of the membrane system. The preferred embodiment cover fabrics have warp and fill ends counts that are greater than 15 ends per inch. End counts of 50 ends per inch in warp and fill are more preferred in order to deliver a stable, more easily processed web. The higher end count also produces a fabric as opposed to an open weave scrim, which is thicker for a given amount of fiber weight.

In the preferred embodiment the uncoated cover fabric has air permeability as measured by ASTM (American Society for Testing and Materials) methods, greater than 100 cfm/ft2 and less than 1000 cfm/ft2. This provides for a maximum level of stability while preserving adequate open area for mechanical strike through or penetration of top coatings to adhesives on the core layers.

Cover fabrics in the prior art can be woven of fiber that is greater than 1600 denier. The preferred embodiment cover fabrics of the invention are made from fiber that is greater than 50 denier and generally much less than 1600 denier. These smaller yarns give the best thickness and cover for a given mass content of fiber. Preferred embodiment cover fabrics utilize at least 5% of the available crossovers in the weave. As in the design of the core woven, the cover fabric(s) are preferably true woven with crossing points in both directions. Cover fabrics containing 100% of the crossing points are preferred for stability. The use of plain weaves gives the most stable weave possible.

Preferred embodiment cover fabrics are supplied and used as off-axis webs in the construction of a flexible membrane of the invention. An off axis web of cover fabric is typically formed by bias cutting from woven or knit tubes. In this process the cover fabric is first formed as a tube. The tube is then slit in a helical manner, resulting in a long sheet or off axis web of cover fabric. This process is typical of bias binding materials.

Forming of off axis web cover fabrics by bias cutting and splicing allows wovens to be used that are not made on shuttle weaving machines. The thinner materials that can be made on this type of shuttle-less machinery allow for having spliced joints in the cover fabric web which do not create large variations in the thickness of the web. It will be readily apparent from this description that the angle of the helical cut will determine the angle of bias of the MD threadline off the axis of the web. For example, a tube cut lengthwise, parallel to the tube axis, will result in a web with an on-axis MD threadline, the length of the tube and the width of the tube diameter. A tube helically cut at a 45 degree angle off the tube axis will produce a web with the MD threadline oriented 45 degrees away from the resulting edge or axis of the tube or resulting web.

After bias cutting, the cover fabrics are laminated to the core fabric with their thread lines oriented at the angle determined by the tube bias cut angle. The tube bias cut angle, as will be readily understood by those skilled in the art from the above description, is selected in advance to produce the desired variation in the cover fabric bias from the reference angles of 0 and 90 degrees of the MD and CM thread lines of the core structure or layer.

For the purpose understanding the following examples and the claims, it can be assumed that the MD (machine direction) and the CM (cross machine) threadlines of the core fabric and the cover layers are constructed at right angles. If the MD of a core layer is designated as a 0 degree reference angle, the CM of the core layer can be understood to be at a nominal 90 degrees to the MD reference angle reference, for all practical purposes. With respect to a core layer MD threadline and the MD threadline of a cover layer, clockwise rotation in the plane of the fabric or the membrane is considered positive, and counterclockwise rotation is negative, as viewed from a common side of the plane of the membrane. If the MD of the core fabric or layer is defined as the 0 degree reference angle, a bias angle of a cover fabric can be stated as between 0 and 90 degrees positive or negative from the MD or reference angle of the core fabric It will be understood that the bias angle applies to the MD of the cover fabric with respect to the MD of the core fabric, and the CM's of the respective layers are displaced 90 degrees from their respective MDs. The distinction between positive and negative bias angles is most noteworthy when there is more than one cover layer, as will be apparent in the examples that follow.

A first preferred embodiment flexible membrane has at least one cover fabric bonded to the core fabric with its MD displaced at a 45 degree bias angle from the MD of the core fabric, so that the flexible membrane system has four threadline angles uniformly distributed at 45 degree apart throughout the membrane. In this example, the angular order of the threadlines is MDcore, MDcover, CMcore, CMcover. These additional threadlines avoid the requirement to use film to support off axis loads.

It will be readily apparent that each additional cover layer within the overall membrane system will add 2 more threadlines to the total, permitting a further reduction on the the average angular displacement as between all threadlines in the plane of the membrane, and permitting further refinement to the inter-layer orientations to optimize the desired combination of performance parameters.

Figure 1B:
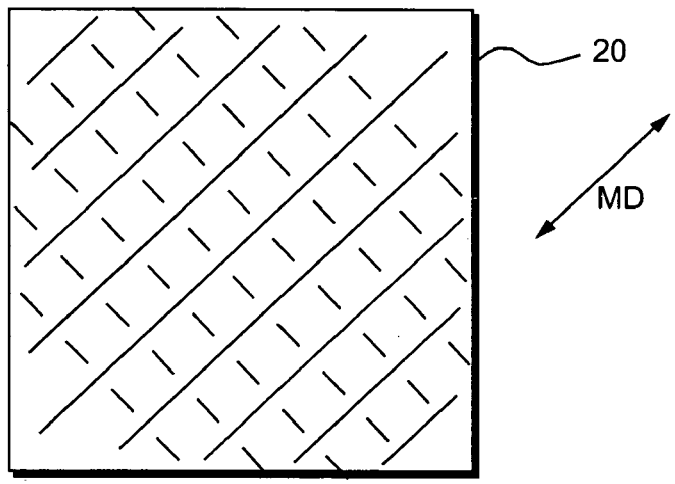
Figure 1C:
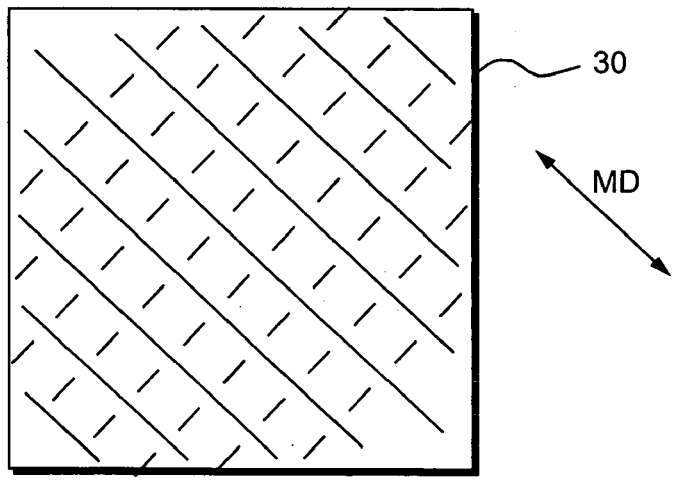
Figure 2:
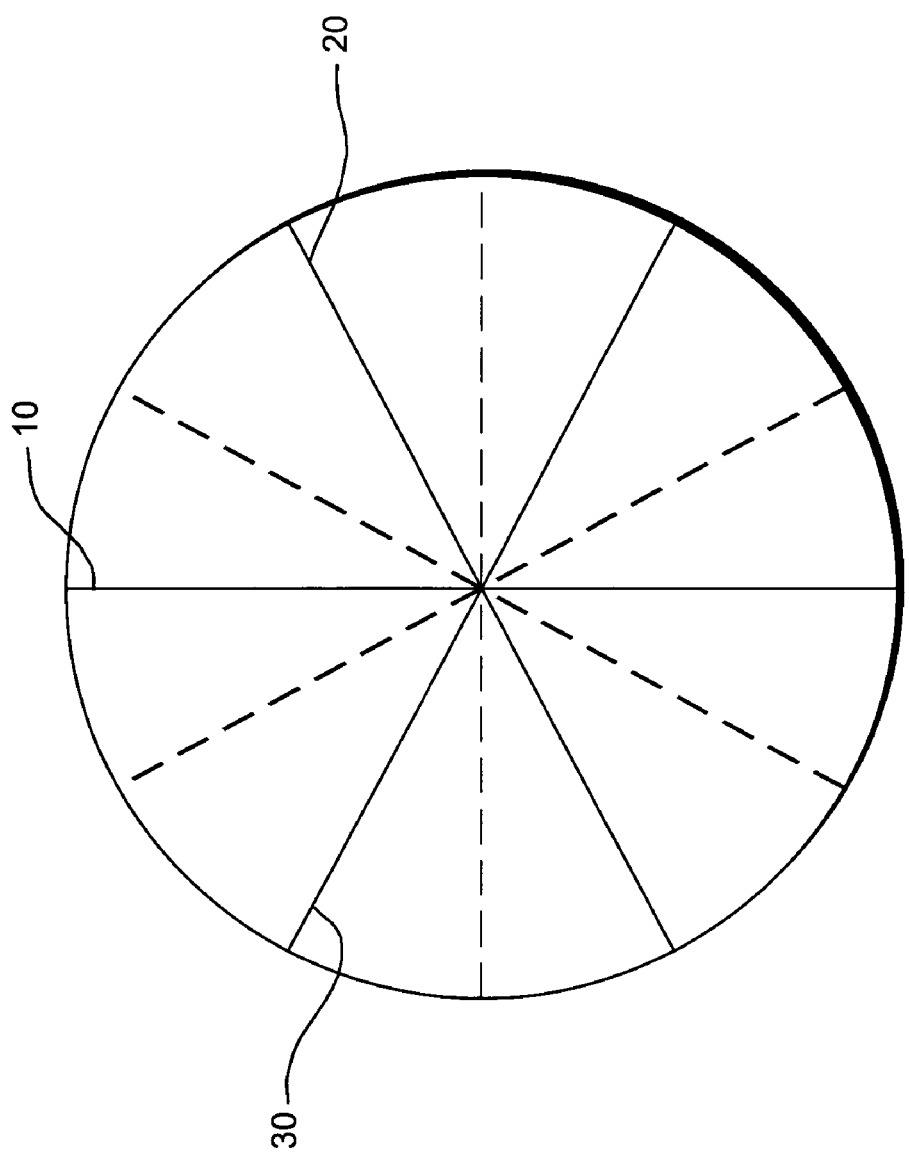
FIG. 2 is a diagrammatic illustration of a point in a composite of the FIG. 1 layers where crossings are superimposed to show the uniform distribution and angular spacing of the machine direction and cross machine threadlines of the three layers.

Referring to FIGS. 1 and 2, for example, in a second preferred embodiment of the invention, two covers 20 and 30 may be applied to the core fabric 10 in various arrangements such as applying one cover to one side of the core fabric, and one cover to the other side of the core fabric, or both both covers to one side of the core fabric. The MD lines are shown as solid lines. The CM threadlines are shown as dashed lines. No inference as to relative density, crossing point coverage or other weave details is intended in these figures. The orientation between layers 10, 20, and 30 with respect to their threadlines may be as follows; e.g. the first cover fabric 20 can have off-axis bias of its MD angle of +60 degrees to the core fabric 10 MD reference angle, and the second cover fabric 30 can have an off-axis bias of −60 degrees. As will be readily apparent from this teaching, the dashed CM threadlines of the cover fabrics 20 and 30 are oriented at minus 30 and plus 30 of the core layer 10 MD reference angle.

Referring specifically to FIG. 2, where a crossing point in each of the three layers of FIG. 1 is hypothetically aligned to illustrate the angular order and displacement of the threadlines, the net result of the calculated off-axis bias in the covers is a three layer, 2 threadlines per layer, flexible laminate or membrane or system that has a fiber-based reinforcement threadline every 30 degrees in the plane of the membrane, with the threadlines alternating between an MD and a CM threadline. The smaller the angle between the thread lines, the smaller the shear angle that the matrix must support. The smaller angles and the alternating MD and CD threadlines also offer the highest control of elongation in a nearly isotropic manner.

As another example, in a third preferred embodiment of the invention, three covers may be applied to the core fabric in various arrangements such as applying one cover to one side of the core fabric, and two covers to the other side of the core fabric, their respective threadline angles may be aligned as follows; e.g. the first cover fabric can have an off-axis bias of +45 or −45 degrees, and the other two can have any combination of 22.5 and 67.5 degree bias angles, both being either positive or negative angles from the reference angle of the core layer. This provides a membrance system that has fiber-based reinforcement every 22.5 degrees in the plane of the membrane. The smaller the angle between the thread lines, the smaller the shear angle that the matrix must support. The orientation of MD's to CD's in the plane of the membrane is not ideally distributed in an alternating manner when there is an odd number of covers and each is used with an exclusive bias angle, but the smaller angles still offer the highest control of elongation in a nearly isotropic manner.

Figure 3:
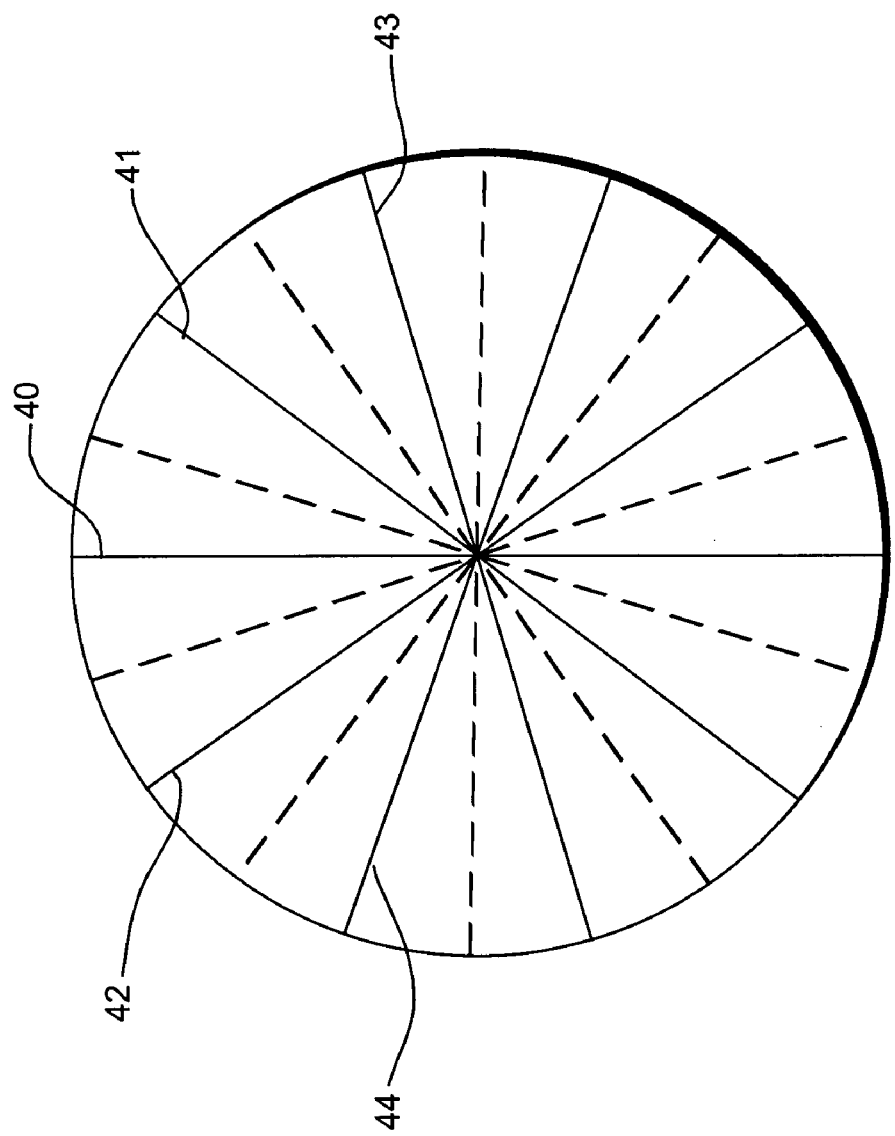
FIG. 3 is a diagrammatic illustration of a 5 layer composite membrane with a core layer and 4 off bias layers configured to provide uniform distribution and angular spacing of the machine direction and cross machine threadlines of the five layers.

Referring to FIG. 3, more covers can be integrated into the design using the principles of the invention to select bias angles contributing to the omnidirectional performance of the membrane. Here, illustrated similarly to the example of FIG. 2, four off-axis covers 41, 42, 43, 44 have been added to a core layer 40, with bias angles of plus and minus 36 degrees and plus and minus 72 degrees, resulting in an MD-CM-MD-CM alternating order of threadlines at 18 degrees apart.

It will be apparent from the above description and examples, and is within the scope of the claims, that in the alternative, while not preferred, the core fabric can be produced and prepared for assembly of the membrane as an off-axis web. The actual MD, although off axis from the running direction of the roll or web from which it is dispensed, may still be designated as the reference angle of the core layer. The MD and CM threadline angles of cover layers are still appropriately referenced and calculated from the actual MD threadlines of the core fabric web, even thought it is not aligned with the length or running direction of the core layer roll or web.

There is no preferred embodiment for yarn type and total fiber content in the cover fabrics. Like the main structural layer, various grades of the system are useful. Depending on the range of modulus and tensile properties required for a specific application, the fiber type and content can be adjusted. For example, the cover fabric may contain yarn of greater than 10 gpd. The cover fabric may contain yarn of less than 10 gpd. And the cover fabric may contain yarn of greater than 10 gpd and yarn of less than 10 gpd.

Lamination systems for bonding core and cover materials provide high peel and tear strength. Core materials or fabrics of the invention, by their design, have controlled and limited void content left unfilled by resin after the cover fabrics are applied and the lamination process is complete. This limited void content reduces the potential for delaminating and mildew problems. In a preferred embodiment membrane, resin is in intimate contact with the core fibers and the cover fibers. Its preferred that a chemical bonding agent be used at this fiber interface to inprove adhesion. There are no film layers between the first fabric cover and the core fabric. Without the use of structural film layers, the adhesive resin systems surround and penetrate the woven elements. This allows for the preferred combination of chemical and mechanical bonding.

The elimination of the film between the cover fabrics and the core fabric permits the cover fabric to be fully saturated with the adhesive resin without significant levels of voids between it and the core layer. The preferred embodiment lamination method and resulting laminate of core and cover does not require film for mechanical performance, but it may contain a film layer at some level external of the structural combination of core and cover for further purposes such as UV resistance.

Thermo plastic resins and coating can be used for thermal repair and heat-sealing for joining of seams when assembling webs of the membrane into useful structural forms such as fluid airfoils, diaphragms, envelopes, and partitions.

Top coating or film can provide good levels of UV (ultraviolet light) protection to the fiber. The materials that provide good UV protection are well known to those skilled in the art. The selection will depend on factors including cost, weight, total life, heat-sealing, and adhesion to other layers. Materials that provide UV protection include but are not limited to EPDM (Ethylene Propylene), Hytril (EBXL-Hytril thermoplastic elastomer), Hypalon(r) brand chlorosulfonated polyethylene elastomers (CSPE), silicone, florosicones, Aliphatic urethanes, acrylic film, floro polymers like Tedlar(r), Kynar(r) or Teflon(r) brand products, vinyl films, and other materials know for their UV resistance. (No claim is made to any such terms as may be trademarks.) Topcoats or films can provide pigmentation and coloration for UV and aesthetic reasons. The addition of pigments to coatings is also well known to those skilled in the art.

In the case where a different fluid is present on the backside of the membrane system, select fibers, yarns, and fabrics, and in particular, special coatings and films appropriate to the particular fluid many be used. The materials may be selected to provide different or additional features or improvements such as solvent resistance, chemical resistance, and controlled permeability to gases.

There are a large number of coatings and films and their several applications that are well known to those skilled in art and are equally applicable here. Given the large number of potential materials that can be contained in the membrane system of the invention, it is not possible to list all possible combinations. Most of the UV resistant materials listed above have applications to the fluid and gas retention. A few materials are unique to gas retention, such as Polyester films, butyl rubber, and Aclar films.

A preferred embodiment flexible membrane of the invention, suitable for use as an airfoil for a large offshore yacht, for example, utilizes a core material which contains 1500 denier Vectran HS(r) brand multifilament liquid crystal polymer yarn in the MD. The construction is 30 yarns in the MD. In this example the stretch or modulus in the MD is less than ¼ percent at a 10 lbf/inch, (pounds force per square inch) with a breaking load of 1690 lbf/inch.

In the cross machine direction the yarn is 1500 denier Vectran HS(r) type thermoplastic material and 500 denier polyester. The weave is 6 ends of polyester and one of the thermoplastic material, repeated three time per inch, for a total of 21 epi. In this example the stretch of the CM is ½ percent at 10 lbf/inch, with a breaking load of 230 lbf/inch.

The weave pattern is modified basket 2×2×2×1 in the fill with the polyster weaving as a pair and the thermoplastic material weaving single. The polyester yarn does not provide the high modulus behavior in the filling but the additional crossing points add significantly to the overall mechanical properties of the woven. The total crossing points of this example is 78%.

The cover fabric for this embodiment is made of a polyester yarn of 70 denier. The weave construction is 50×50 epi. The uncoated permeability as measured by ASTM methods is 400 cfm/ft$^2$. The weave is plain.

The cover fabric is scoured free of contaminants and coated with stabilizing adhesive resin such as a urethane. The resin coating helps stabilize the cover fabric during the biasing process. The cover fabric is cut and formed into a 45-degree bias materials as described above, using adhesive bonding of lap joints where necessary.

The core material is coated both sides with a urethane resin and a biased cover fabric is applied to each side in a lamination process.

A top coating is made of a resin based on aliphatic urethane, pigmented with five percent by weight of titanium dioxide pigment. The coating is applied to the each of the cover fabric in a 1.5 mil thickness. The mass per square yard of the laminate is 17.5 oz/yd$^2$. The thickness of the coating is 22 mils. The resulting flexible membrane system as tested by the applicant had an MD slit tear measurement when performed to FAA (Federal Aviation Administration) standards, of 580 lbf/in.

As will be readily understood by those skilled in the art, the preferred embodiments are illustrative of the invention, and not exhaustive of the scope of the invention. Other and various embodiments are within the scope of the invention as described above and claimed below.

For example, there is within the scope of the invention a flexible laminate system with at least one core consisting of a fibrous layer configured with elongation in the MD at 50 pounds force per inch of web of less than 0.5 percent elongation, and at least one cover comprising a fabric layer with yarn spacing in at least one direction greater than 15 ends per inch, where the cover is bonded to the core with the cover MD axis at a bias angle with respect to the core MD.

The bias angles may be about 45 degrees respectively. The cover may be at least a first and a second cover, where the first cover bias angle is about +60 degrees, and the second cover bias angle is about −60 degrees. And the at least one cover may be at least a first, second and third cover, where the first cover bias angle is about +22.5 degrees, the second cover bias angle is about −45 degrees, and the third bias angle is about +67.5 degrees. And also, the at least one cover may be at least first, second, third, and fourth covers, where the covers have respective bias angles of about +36 degrees, −36 degrees, +72 degrees, and −72 degrees.

Also, the at least one cover may be multiple covers, where the covers are bonded to the core with respective cover MD's at different bias angles with respect to the core MD. The fibrous layer may be a woven layer having less than 2 percent crimp in the MD. And the woven layer may have less than 50% of its available crossing points. The flexible laminate system may further consist of a UV protective film layer external of the core and the cover.

As another example, there is a flexible laminate system with first and second woven layers, where the first layer has less than 2% crimp in the MD, and the second layer includes at least one cover layer with yarn spacing in at least one direction of greater than 15 ends per inch. The first woven layer is combined with the second woven layer such that the first layer is bonded to the cover layer with the cover layer MD at a bias angle to the first layer MD. Also, the second woven layer may consist of multiple cover layers, where the first layer is combined with the second layer such that the cover layers are bonded to the first layer with respective cover layer MDs at different bias angles with respect to the first layer MD.

The first woven layer may have elongation in the MD at 50 pounds force per inch of web of less than 0.5 percent. The first woven layer may have less than 50% of its available crossing points used.

As yet another example, there is a flexible laminate system with first and second woven layers, where the first layer is a core layer that has less than 50% of its available crossing points, the second layer consists of a cover layer with yarn spacing in at least one direction of greater than 15 ends per inch, and the cover layer is bonded to the first layer with its cover layer MD at a bias angle to the first layer MD.

Also, the second woven layer may be or have multiple cover layers, where the first layer is combined with the second layer wherein the cover layers are bonded to the first layer with respective cover layer MDs at different bias angles with respect to the first layer MD.

The first woven layer may have elongation in the MD at 50 pounds force per inch of web of less than 0.5 percent. The first woven layer may have less than 2% crimp in the MD.

There is also another example; a flexible laminate system consisting of a core and at least two covers of a common cover fabric, where the core uses 1500 denier thermoplastic multifilament liquid crystal polymer yarn, the core construction has up to 30 epi in the MD with elongation in the MD of less than 0.25 percent at 10 lbf/inch. The core consists of mutlifilament liquid crystal polymer yarn and polyester yarn alternated in a modified weave pattern having at least 21 epi in the CM, with elongation in the CM of not more than 0.5 percent at 10 lbf/inch. The total core crossing points consist of greater than 50 percent. The common cover fabric consists of 70 denier polyester yarn woven at 50×50 epi, with a resin coating, cut and formed with a 45 degree bias angle. There is a cover applied to one or each side of the core, and an aliphatic urethane resin top coating is applied to each cover.

Other examples within the scope of the invention and the claims that follow will be readily apparent to those skilled in the art from the description and figures provided.

I claim:

1. A flexible laminate system comprising a core and at least two covers of a cover fabric,
    said core comprising 1500 denier thermoplastic multifilament liquid crystal polymer yarn, core construction having up to 30 epi in the MD, with elongation in the MD of less than 0.25 percent at 10 lbf/inch, said core comprising thermoplastic mutlifilament liquid crystal polymer yarn and polyester yarn alternated in a modified weave pattern having at least 21 epi in the CM, with elongation in the CM of not more than 0.5 percent at 10 lbf/inch,
    said cover fabric comprising 70 denier polyester yarn woven at 50×50 epi, with resin coating, cut and formed with a 45 degree bias angle,
    a said cover applied to each side of said core, and
    an aliphatic urethane resin top coating applied to each said cover.

* * * * *

UNITED STATES PATENT AND TRADEMARK OFFICE
CERTIFICATE OF CORRECTION

| | | |
|---|---|---|
| PATENT NO. | : 6,998,165 B2 | Page 1 of 1 |
| APPLICATION NO. | : 10/293828 | |
| DATED | : February 14, 2006 | |
| INVENTOR(S) | : Charles A. Howland | |

It is certified that error appears in the above-identified patent and that said Letters Patent is hereby corrected as shown below:

Column 3,
Line 59, delete "on the of the", insert --be used on the interface of the core and cover--

Signed and Sealed this

Fifth Day of December, 2006

JON W. DUDAS
*Director of the United States Patent and Trademark Office*